United States Patent
Gordon et al.

(10) Patent No.: US 10,179,965 B1
(45) Date of Patent: Jan. 15, 2019

(54) RADIOLOGY GARMENT DISPENSING, CLEANING, AND TRACKING SYSTEM

(71) Applicants: Nikia Gordon, Massapequa, NY (US); Tashma Watson, Brooklyn, NY (US)

(72) Inventors: Nikia Gordon, Massapequa, NY (US); Tashma Watson, Brooklyn, NY (US)

( * ) Notice: Subject to any disclaimer, the term of this patent is extended or adjusted under 35 U.S.C. 154(b) by 203 days.

(21) Appl. No.: 15/246,022

(22) Filed: Aug. 24, 2016

Related U.S. Application Data (60) Provisional application No. 62/212,428, filed on Aug. 31, 2015.

(51) Int. Cl.
| | |
|---|---|
| *B08B 1/00* | (2006.01) |
| *B65G 1/16* | (2006.01) |
| *G06K 7/00* | (2006.01) |
| *G21F 3/02* | (2006.01) |
| *G21F 3/03* | (2006.01) |
| *A47G 25/06* | (2006.01) |
| *D06F 39/00* | (2006.01) |
| *G21F 3/025* | (2006.01) |

(52) U.S. Cl.
CPC ........... *D06F 39/005* (2013.01); *A47G 25/06* (2013.01); *B08B 1/002* (2013.01); *B65G 1/16* (2013.01); *G06K 7/0008* (2013.01); *G21F 3/02* (2013.01); *G21F 3/025* (2013.01); *G21F 3/03* (2013.01)

(58) Field of Classification Search
CPC ...................................................... G06F 17/00
See application file for complete search history.

(56) References Cited

U.S. PATENT DOCUMENTS

| | | | |
|---|---|---|---|
| 5,912,818 A | * | 6/1999 | McGrady ................ G06M 7/04 700/214 |
| D424,198 S | | 5/2000 | Shepherd et al. |
| 6,330,856 B1 | | 12/2001 | Fitzgerald et al. |

(Continued)

FOREIGN PATENT DOCUMENTS

WO    WO2004086165    10/2004

OTHER PUBLICATIONS

Locker X-ray Apron Hanger—683452—Infab product available online. 2108.*

*Primary Examiner* — Gregory R Delcotto
*Assistant Examiner* — Preeti Kumar
(74) *Attorney, Agent, or Firm* — Goldstein Law Offices, P.C.

(57) ABSTRACT

A radiology garment storage and cleaning system, for storing and cleaning radiology garments, each garment including a radiology apron and a radiology collar. The radiology garment storage and cleaning system includes a storage apparatus, which is divided into a number of compartments for accepting a radiology garment, the compartments extending from the first side to the second side. Each compartment is equipped with a cleaning system, a door with a lock and at least one status light. The storage apparatus also includes an ID card and a monitoring system which is in electronic communication with the ID card reader, the lock of each compartment, each of the cleaning mechanisms, and the status light of each compartment. The monitoring system is configured to monitor when the radiology garment is placed in one of the compartments, automate the cleaning of the garment, and track the garment's usage.

6 Claims, 5 Drawing Sheets

(56) References Cited

U.S. PATENT DOCUMENTS

| | | | |
|---|---|---|---|
| 6,845,888 B2 * | 1/2005 | Verherbrugghen | A47K 5/12 |
| | | | 222/162 |
| 7,350,680 B2 | 4/2008 | DeBroeck | |
| 7,474,938 B2 | 1/2009 | Poliner | |
| 7,663,128 B2 | 2/2010 | Arterson | |
| 8,608,022 B1 * | 12/2013 | Kory | A61F 15/001 |
| | | | 221/1 |
| 8,763,824 B2 | 7/2014 | Alcock | |
| 8,955,164 B1 | 2/2015 | Ruthemeyer | |
| 2006/0191965 A1 | 8/2006 | DeBroeck | |

* cited by examiner

RADIOLOGY GARMENT DISPENSING, CLEANING, AND TRACKING SYSTEM

CROSS REFERENCES AND RELATED SUBJECT MATTER

This application is a non-provisional patent filing of provisional patent application Ser. No. 62/212,428, filed in the United States Patent Office on Aug. 31, 2015.

TECHNICAL FIELD

The present disclosure relates generally to a radiology garment dispensing, cleaning, and tracking system. More particularly, the present disclosure relates to a system for storing, cleaning, and monitoring the use of radiology garments, each garment may include a radiology apron and a radiology collar.

BACKGROUND

The use of x-ray imagery is almost ubiquitous in facilities that provide healthcare services. X-ray imagery allows doctors to view the internal structures of patients without conducting invasive surgery. There are a number of techniques that use x-ray radiation in order to obtain images of a patient, such as radiography, computed tomography, and fluoroscopy. While the exact use of x-rays in generating diagnostic quality imaging differs, all of these techniques on some level bombard the patient with x-ray radiation.

While x-ray radiation can be an incredibly useful diagnostic tool, overexposure to x-ray radiation can cause serious harm or death in patients. As such, the use of radiation shielding garments has become standard practice whenever a patient is subjected to x-ray radiation.

However, as x-ray imagery is being utilized in increasing amounts, the ability of healthcare facilities to maintain adequate supplies of these radiology garments becomes a large challenge. Further, there are regulatory requirements that place restrictions on the use and cleaning of radiology garments in healthcare facilities, set forth by organizations such as the Centers for Medicare and Medicaid Services, the Department of Health, and the Joint Commission on Accreditation of Healthcare Organizations. While beneficial, these regulations result in additional hurdles to providing x-ray imagery to patients. Accordingly, there is a need for a device that can provide an automated cleaning service, as well as track the usage of radiology garments used by healthcare facilities.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a radiology garment dispensing and cleaning system that is capable of tracking the amount of use of each of the garments in a facility inventory. Accordingly, the present disclosure provides a radiology garment dispensing and cleaning system that allows a healthcare facility to more easily dispense, clean, and monitor the use and cleaning of all of its radiation shielding garments. The system provides each user with an ID card having a unique identifier. Garments are tracked/followed according to when each user scans his or her ID card to retrieve or replace one of the garments.

Accordingly, the present disclosure describes a radiology garment storage and cleaning system, for storing and cleaning radiology garments, each garment including a radiology apron and a radiology collar. The radiology garment storage and cleaning system includes a storage apparatus, which is divided into a number of compartments for accepting a radiology garment, the compartments extending from the first side to the second side. Each compartment is equipped with a cleaning system, a door with a lock and at least one status light. The storage apparatus also includes an ID card and a monitoring system which is in electronic communication with the ID card reader, the lock of each compartment, each of the cleaning mechanisms, and the status light of each compartment. The monitoring system is configured to monitor when the radiology garment is placed in one of the compartments, automate the cleaning of the garment, and track the garment's usage.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
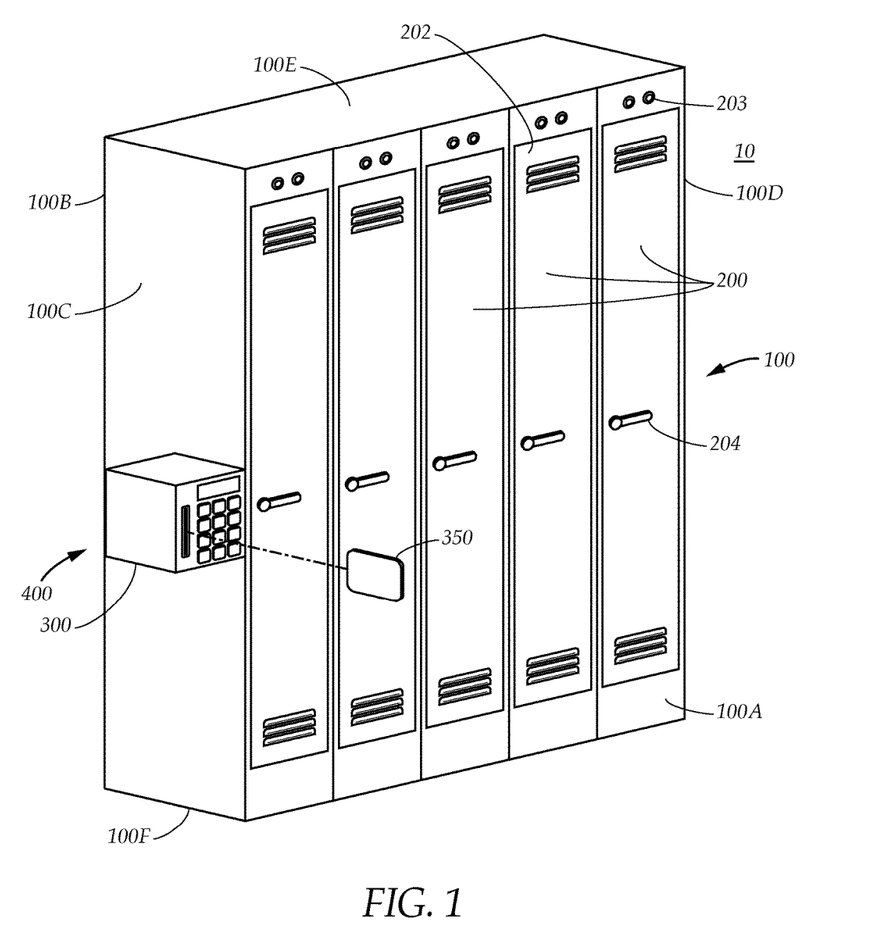
FIG. 1 is a diagrammatic perspective view, showing an example embodiment of the radiology garment dispensing and cleaning system according to the present disclosure.

FIG. 1 illustrates a radiology garment storage and cleaning system, having a storage apparatus 100, an ID card reader 300, and a monitoring system 400. The system is used by a plurality of users, each user having an ID card 350 that contains unique identifying information. The storage apparatus 100 has a front end 100A, a rear end 100B, a first side 100C, a second side 100D, a top surface 100E, and a bottom surface 100F. The storage apparatus 100 also has a plurality of compartments 200, located between the first side 100C and the second side 100D. Each of the plurality of compartments 200 extends from the front end 100A to the rear end 100B, and extends partially between the first side 100C and the second side 100D. Further, each of the plurality of compartments is equipped with a door 202, at least one status light 203, and a lock 204, wherein the lock 204 and at least one status light 203 is in electronic communication with the monitoring system 400. In some embodiments, the door 202 is equipped with at least one vent to facilitate drying following the cleaning operation described hereinbelow. Each of the plurality of compartments 200 is sized to accommodate at least one radiology garment. Here, the radiology garment refers to a radiation apron, a radiation collar, or some combination thereof. As will be described hereinafter, each radiology garment is uniquely identified and its usage is tracked indirectly—by tracking the user withdrawing and replacing the radiology garment into one of the compartments 200 as permitted by the monitoring system 400 locking and unlocking compartments. Thus, the garment is tracked when one of the compartments containing the garment is unlocked by the user ID of one of the users, and the garment is then associated with that user. The garment is further tracked when that user unlocks one of the compartments using their ID card to return the garment, and the garment is presumed to then be the one subsequently located in that compartment.

The ID card reader 300 is preferably mounted adjacent to the storage apparatus 100. In a preferred embodiment, the monitoring system 400, which features a memory unit and a processor, is housed within the ID card reader 300. The monitoring system 400 may also be in a remote location and communicate with ID card reader 300 via a computer network such as the Internet. The monitoring system 400 keeps track of which ID card is used, when the ID is used, and the status of one or more radiology garments associated with the ID card. As will be described in detail hereinbelow, by associating the usage of one of the ID cards with the locking and unlocking of the storage components, the usage of the radiology garments stored in the storage compartments can be tracked by the monitoring system 400.

Figure 2:
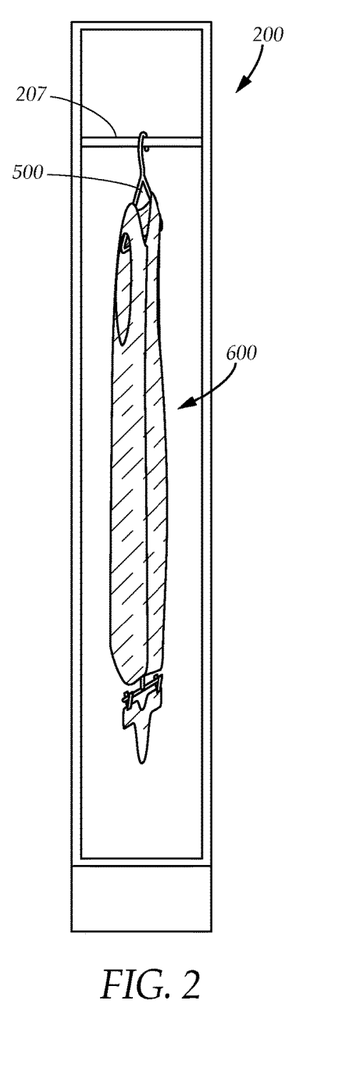
FIG. 2 is a perspective view of an embodiment of a compartment of the storage apparatus of the present invention, where a radiology garment is shown hanging on an embodiment of a hanger according to the present disclosure.

Referring to FIG. 2, a side view of one embodiment of one of the plurality of compartments 200 is shown. Here, the compartment features a hanging mechanism 207, a hanger 500, and a radiology garment 600. As can be seen, the hanger 500 preferably hangs on the hanging mechanism 207.

Figure 3A:
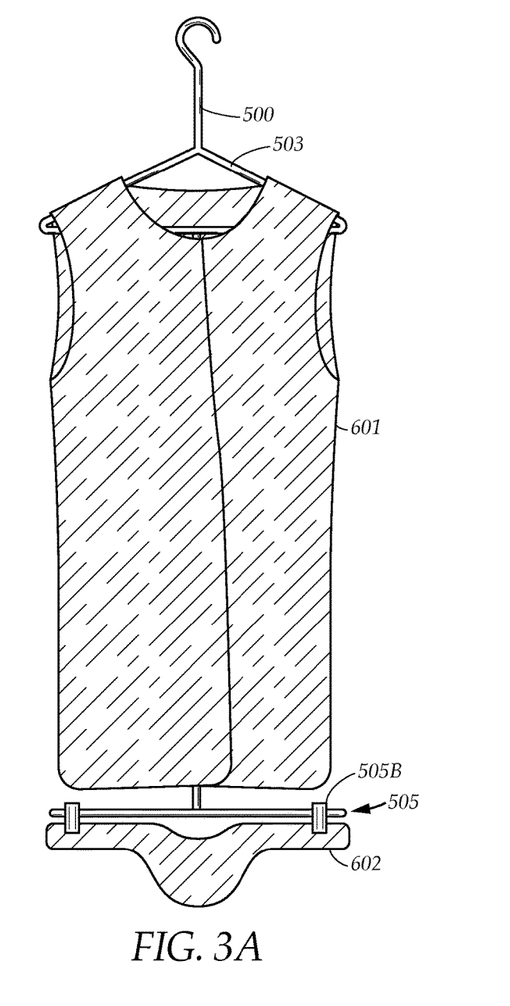
FIG. 3A is a front view of a radiology garment hanging on an embodiment of the hanger according to the present disclosure.
Figure 3B:
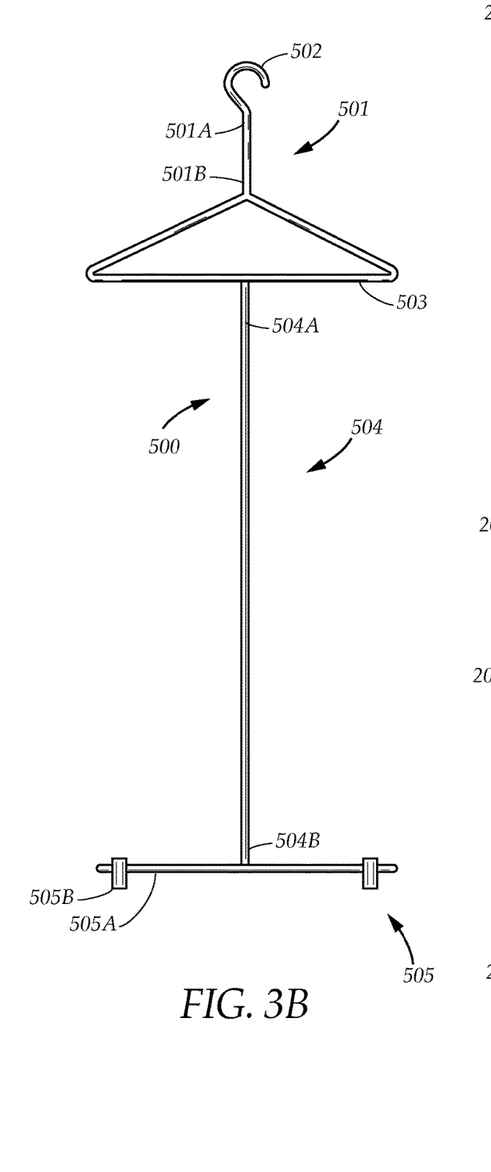
FIG. 3B is a front view of an embodiment of the hanger according to the present disclosure.

FIG. 3A shows a radiology apron 601 and a radiology collar 602 hanging on the hanger 500. FIG. 3B shows the hanger 500 without the radiation apron 601 or radiation collar 602 so that the individual components of the hanger 500 can be better seen. Specifically, hanger 500 features neck a 501, a hook 502, a triangular part 503, a stem 504, and a clamp mechanism 505. The neck 501 has a top end 501A and a bottom end 501B. The hook 504 is attached to the top end 501A and the triangular part 503 is attached to the bottom end 501B. The stem 504 has a top portion 504A and a bottom portion 504B. The top portion 504A is connected to the triangular part 503, and the bottom portion 504B is connected to the clamp mechanism 505. Preferably, the clamp mechanism 505 has a horizontal component 505A and at least two clamps 505B, wherein the at least two clamps 505B are rotatably attached to the horizontal component 505A.

Figure 4:
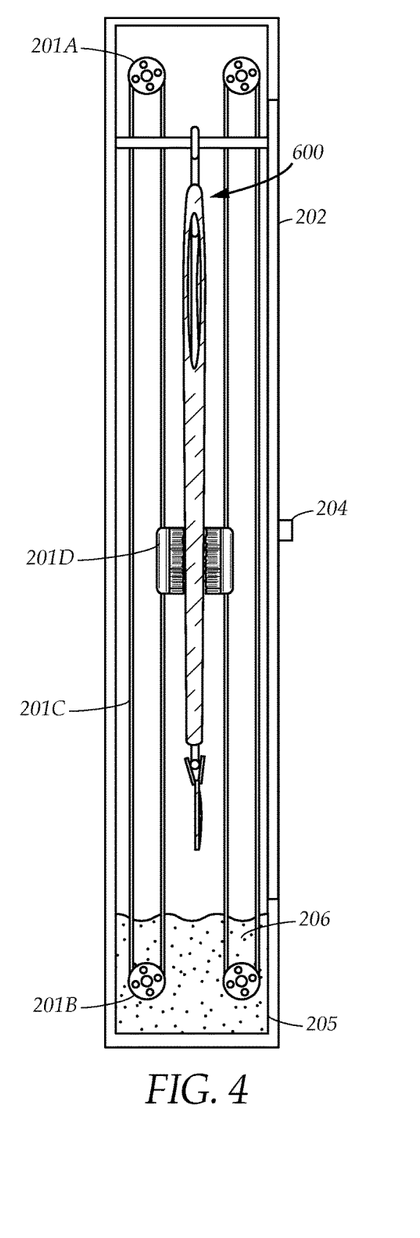
FIG. 4 is a side view of an embodiment of a compartment of the present invention equipped with the cleaning system of the present invention, with a radiology garment hanging on an embodiment of the hanger according to the present disclosure.

Referring back to FIG. 3A, the radiation apron 601 is shown resting on and supported by the triangular part 503, and the collar is shown held by the clamp mechanism 505 via at least two clamps 505B. Preferably, the collar is held substantially taut and flat by the at least two clamps 602, and substantially planar with the radiation apron 601. FIG. 4 shows another embodiment of one of the plurality of compartments 200, featuring a cleaning system 201, a liquid impermeable bottom 205, and a volume of cleaning solution 206. The cleaning system 201 preferably comprises a first pulley 201A, a second pulley 201B, a cable 201C, and at least one brush 201D mounted on and vertically movable by the cable 201C. The door 202 and the lock 204 are also shown here for reference. Here, the at least one brush 201D engages with and cleans the garment 600. Controlled by the monitoring system 400, cleaning mechanism 201 operates by rotating the first pulley 201A, the second pulley 201B, or both to vertically move the at least one brush 201D vertically across garment 600. Preferably, the cleaning system comprises two first pulleys 201A, two second pulleys 201B, two cables 201C, and at least two brushes 201D, one brush attached to each cable 201C, as shown here, wherein the brushes 201D are configured to be at the same vertical and opposed to each other so that they both engage the garment simultaneously at the same height but from opposite sides. This provides the preferable configuration where each brush 201D engages with and cleans one side of garment 600, allowing for comprehensive cleaning. Preferably, during the cleaning mechanism 201 operation, the brush 201D will be submerged in the volume of cleaning solution at least momentarily, proximate to second pulley 201B. This allows the brush 201D to become at least partially infused with cleaning solution, providing more efficient cleaning of garment 600 and provide anti-bacterial treatment to the garment. Preferably, as a safety feature, cleaning system 201 will only operate to clean the garment 600 when the lock 204 is engaged. Generally, the system will wait for a predetermined amount of time before allowing the garment to be dispensed to one of the users, so as to provide the garment with sufficient time to dry. In addition, drying apparatus, including fans, heating elements and lights, etc., may be provided within the compartment to speed drying of the garment 600.

Figure 5:
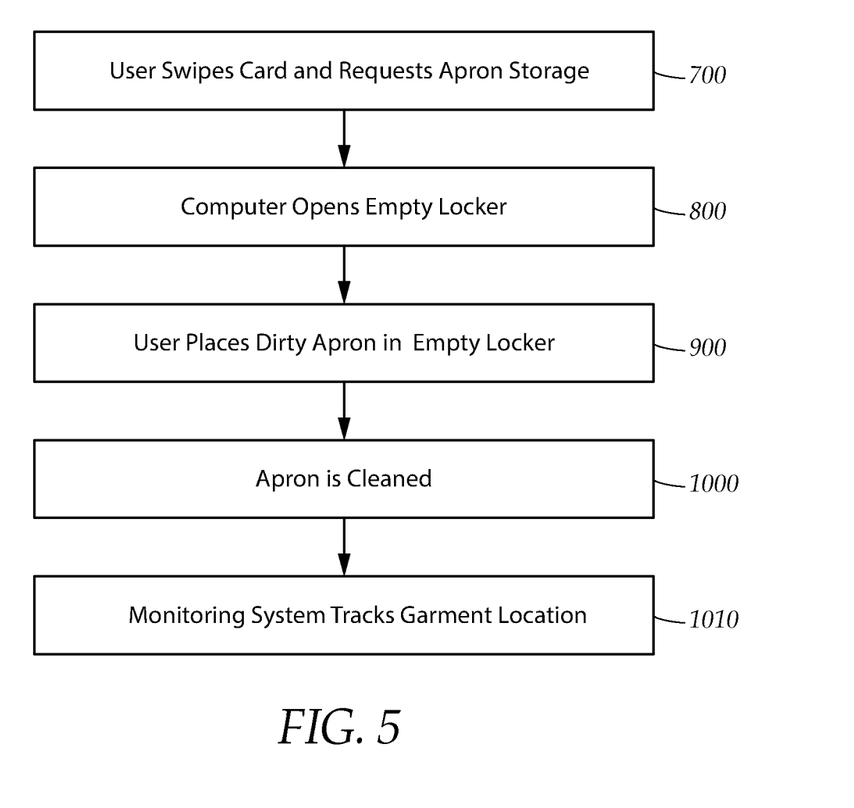
FIG. 5 is a sample flow chart showing an embodiment of the method of cleaning a radiology garment according to the present disclosure.

FIG. 5 shows an example flow chart of a method of cleaning a radiology garment of the present invention. In step 700, using the radiation dispensing and cleaning apparatus, one of the users swipes their ID card through card reader 300 to request garment storage. In step 800, monitoring system 400, after receiving the user identifying information on the ID card, finds an unoccupied compartment 200 and disengages that compartment's lock 204. From there, in step 900 the user places the radiology garment in the unlocked compartment 200 and shuts the door 202. Subsequently, monitoring system 400 determines that the door 202 is closed, engages the lock 204, and subsequently operates the appropriate cleaning mechanism 201 in step 1000. When the system is finished cleaning, it indicates to the user that the radiology garment is clean by illuminating the at least one status light 203. The monitoring system thereby tracks the garment location as being within said compartment 1010.

In some embodiments, the present invention is equipped with multiple status lights, each light having a unique color, and each color corresponding to a state of cleaning. For example, no illuminated lights corresponds to an empty compartment; a red light corresponds to a dirty radiology garment being in the compartment, a yellow light corresponds to a compartment that is currently cleaning a garment, and a green light corresponds to a compartment being occupied with a cleaned garment. This is just one example of how the at least one status light 203 could be used to visually indicate to a user the state of a compartment's contents. Monitoring system 400 will then log the radiology garment as being used an additional time, and will timestamp that log. Monitoring system 400 is capable of determining the time between a radiology garment being cleaned and checked out. This will help a user determine the volume of a particular garment, and will help users manage their inventory of radiology garments.

Figure 6:
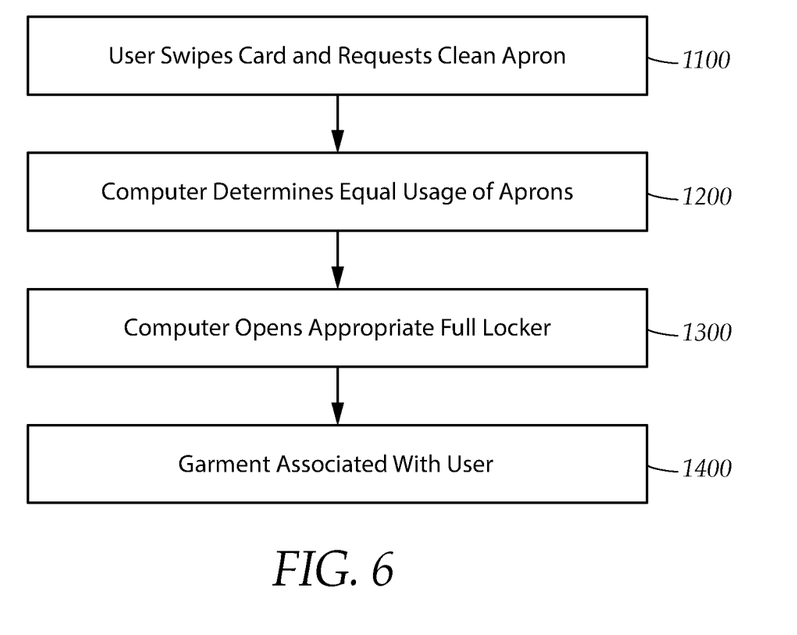
FIG. 6 is a sample flow chat showing an embodiment of the method of dispensing a radiology garment according to the present disclosure.

FIG. 6 shows another example flow chart of an embodiment of the method of dispensing a radiology garment. When the user desires a radiology garment, from the radiation dispensing and cleaning system of the present invention, they will first swipe their ID card to request a garment in step 1100. In step 1200, after monitoring system 400 receives the information located on the ID card, it will determine the amount of use on the garments stored in the system. This can be calculated by, for example, the amount of times the radiology garment has been placed into, cleaned by, and dispensed by the system. After determining the garment with the least amount of use contained in the system, the method proceeds to step 1300 where the compartment containing that garment is opened. The user removes the garment from the hanger and then closes that door of that compartment. The garment is associated with the user 1400, so that when that user again swipes his or her ID card to open one of the empty compartments, the garment will be presumed to then be the garment within said compartment.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a radiology garment dispensing and cleaning system. The disclosure is illustrated by example in the drawing figures, and throughout the written description. It should be understood that numerous variations are possible, while adhering to the inventive concept. Such variations are contemplated as being a part of the present disclosure.

What is claimed is:

1. A radiology garment storage and cleaning system, for storing cleaning, and tracking radiology garments, each garment including a radiology apron and a radiology collar, for use by a plurality of users, each user having an ID card with a unique identifier, comprising:

a storage apparatus having a front end, a rear end, a first side extending from the front end to the rear end, a second side extending from the front end to the rear end, a top surface, and a bottom surface, the top surface and bottom surface each being connected to the front end, the rear end, the first side, and the second side, wherein the storage apparatus is divided into a plurality of compartments for accepting a radiation apron, the plurality of compartments extending from the first side to the second side, wherein each compartment spans from the front end to the rear end and extends partially from the first side to the second side, wherein each compartment is equipped with a cleaning system, a door disposed on the front end, a lock integrated with the door, and at least one status light, and wherein each compartment has a hanging mechanism and a liquid-impermeable bottom portion extending from the bottom surface;

an ID card reader, disposed on the storage apparatus,
wherein the ID card reader is capable of reading the ID card and determining its unique identifier; and a monitoring system, having a memory unit, and a processor,
wherein the monitoring system is in electronic communication with the ID card reader, the lock of each compartment, each of the cleaning mechanisms, and the status light of each compartment, and wherein the monitoring system is configured to monitor when the radiation apron is placed in one of the plurality of compartments, monitor the last time each of the cleaning mechanisms were used, and operate each of the cleaning systems wherein the cleaning mechanism further comprises two scrubbing mechanisms, each scrubbing mechanism having: a first pulley, rotatably attached to the compartment and proximate to the top surface;

a second pulley, rotatably attached to the compartment and within the volume of cleaning solution; a cable rotatably attached to the first and second pulley; and at least one brush fixed to cable, the cable selectively moving the brush downwardly to the liquid-impermeable bottom portion and moving the brush vertically alongside the garment to engage and clean the garment on a hanger.

2. The system of claim 1, wherein the hanging mechanism in each of the compartments includes a hanger, the hanger having:
   a neck with a top and bottom end;
   a hook fixed to the top end of the neck;
   a triangular part fixed to the bottom end of the neck for directly supporting one of the radiology aprons;
   a clamp mechanism for supporting one of the radiology collars; and
   a stem extending downwardly from the triangular part, the stem having a top portion fixed to the triangular part and
   a bottom portion attached to the clamp mechanism.

3. The system of claim 2, the clamp mechanism comprising a horizontal component that is fixed to the bottom portion, and at least two clamps rotatably attached to the horizontal component.

4. The system of claim 2, wherein the triangular part is sized to accommodate a radiation apron and the clamp mechanism is sized to accommodate a radiation collar.

5. The system of claim 1, wherein a volume of cleaning solution is located within the liquid-impermeable bottom portion.

6. The system of claim 1, wherein the cleaning system is configured to move the brush downwardly to the liquid-impermeable bottom portion and move the brush vertically alongside the garment to engage and clean the garment on the hanger only when the lock is engaged.

\* \* \* \* \*